(12) United States Patent
Zhao et al.

(10) Patent No.: US 11,961,242 B2
(45) Date of Patent: Apr. 16, 2024

(54) TARGET TRACKING METHOD, COMPUTER DEVICE, AND STORAGE MEDIUM

(71) Applicant: TENCENT TECHNOLOGY (SHENZHEN) COMPANY LIMITED, Shenzhen (CN)

(72) Inventors: Yandan Zhao, Shenzhen (CN); Chengjie Wang, Shenzhen (CN); Weijian Cao, Shenzhen (CN); Yun Cao, Shenzhen (CN); Pan Cheng, Shenzhen (CN); Yuan Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 804 days.

(21) Appl. No.: 17/033,675

(22) Filed: Sep. 25, 2020

(65) Prior Publication Data
US 2021/0012510 A1 Jan. 14, 2021

Related U.S. Application Data

(63) Continuation of application No. PCT/CN2019/097343, filed on Jul. 23, 2019.

(30) Foreign Application Priority Data

Aug. 1, 2018 (CN) .......................... 201810867036.8

(51) Int. Cl.
G06K 9/00 (2022.01)
G06N 20/00 (2019.01)
(Continued)

(52) U.S. Cl.
CPC ............. G06T 7/246 (2017.01); G06N 20/00 (2019.01); G06T 7/20 (2013.01); G06V 10/25 (2022.01);
(Continued)

(58) Field of Classification Search
None
See application file for complete search history.

(56) References Cited

U.S. PATENT DOCUMENTS 8,934,665 B2 * 1/2015 Kim ........................ G06F 18/22
382/209
9,696,404 B1 7/2017 Doyle et al.
(Continued)

FOREIGN PATENT DOCUMENTS

CN 103259962 A 8/2013
CN 107066990 A 8/2017
(Continued)

OTHER PUBLICATIONS

The World Intellectual Property Organization (WIPO) International Search Report for PCT/CN2019/097343 dated Oct. 18, 2019 5 Pages (including translation).
(Continued)

Primary Examiner — Soo Jin Park
(74) Attorney, Agent, or Firm — ANOVA LAW GROUP, PLLC

(57) ABSTRACT

A target tracking method is provided for a computer device. The method includes determining a target candidate region of a current image frame; capturing a target candidate image matching the target candidate region from the current image frame; determining a target region of the current image frame according to an image feature of the target candidate image; determining motion prediction data of a next image frame relative to the current image frame by using a motion prediction model and according to the image feature of the target candidate image; and determining a target candidate region of the next image frame according to the target region and the motion prediction data.

18 Claims, 9 Drawing Sheets

(51) Int. Cl.
  *G06T 7/20*  (2017.01)
  *G06T 7/246*  (2017.01)
  *G06V 10/25*  (2022.01)
  *G06V 10/40*  (2022.01)
  *G06V 10/764*  (2022.01)
  *G06V 20/52*  (2022.01)

(52) U.S. Cl.
  CPC ............ *G06V 10/40* (2022.01); *G06V 10/764* (2022.01); *G06V 20/52* (2022.01); *G06T 2207/20076* (2013.01); *G06T 2207/20081* (2013.01)

(56) References Cited

U.S. PATENT DOCUMENTS

| | | | |
|---|---|---|---|
| 2016/0148054 A1* | 5/2016 | Han | G06T 7/269 382/103 |
| 2017/0337711 A1 | 11/2017 | Ratner et al. | |
| 2018/0253595 A1 | 9/2018 | Aoki et al. | |
| 2019/0034734 A1* | 1/2019 | Yen | G06F 18/2413 |
| 2019/0114804 A1* | 4/2019 | Sundaresan | G06T 7/74 |
| 2019/0130191 A1* | 5/2019 | Zhou | G06V 20/52 |
| 2019/0130594 A1* | 5/2019 | Seyfi | G06V 10/764 |
| 2019/0138791 A1 | 5/2019 | Wang et al. | |
| 2019/0213420 A1* | 7/2019 | Karyodisa | G06V 20/41 |

FOREIGN PATENT DOCUMENTS

| | | |
|---|---|---|
| CN | 107784279 A | 3/2018 |
| CN | 108280843 A | 7/2018 |
| CN | 108961315 A | 12/2018 |
| CN | 106295567 B | 4/2019 |
| JP | 2014067269 A | 4/2014 |
| WO | 2017056382 A1 | 4/2017 |

OTHER PUBLICATIONS

The State Intellectual Property Office of the People's Republic of China (SIPO) Office Action 1 for 201810867036.8 dated Jul. 24, 2019 13 Pages (including translation).

Yong Qing Qian et al., "Camshift and Kalman Predicting Based on Moving Target Tracking," Computer Engineering & Science, vol. 32, No. 8, Aug. 30, 2010 (Aug. 30, 2010), pp. 81-83, 137 4 Pages.

Dun Mao et al., "Object tracking integrating template matching and mean shift algorithm," 2011 International Conference on Multimedia Technology, Aug. 30, 2011 (Aug. 30, 2011), pp. 3583-3586 4 Pages.

Paul Viola et al., "Robust Real Time Face Detection," Proceedings Eighth IEEE International Conference on Computer Vision. ICCV 2001. 1 page.

The European Patent Office (EPO) Office Action 1 for for 19844552.0 dated Jul. 15, 2021 8 Pages (including translation).

* cited by examiner

ID No. 2018108670368, entitled "TARGET TRACKING
TARGET TRACKING METHOD, COMPUTER DEVICE, AND STORAGE MEDIUM

RELATED APPLICATIONS

This application is a continuation application of PCT Patent Application No. PCT/CN2019/097343, filed on Jul. 23, 2019, which claims priority to Chinese Patent Application No. 2018108670368, entitled "TARGET TRACKING METHOD, DEVICE, AND COMPUTER DEVICE, AND STORAGE MEDIUM" filed on Aug. 1, 2018, content of all of which is incorporated herein by reference in its entirety.

FIELD OF THE TECHNOLOGY

This application relates to the field of computer technologies and, in particular, to a target tracking method, a computer device, and a storage medium.

BACKGROUND

With the rapid development of computing technology, the development of image processing technology has also been accelerated. In the field of image processing technology, especially in the field of video image processing, a target in a video image needs to be tracked.

However, for conventional target tracking in a video image, generally, only a target that moves relatively slowly in the video image can be tracked. During the tracking of a target in the video image, if the target moves relatively fast, the tracking of the target tends to fail or the target is prone to loss, making it difficult to track the target. As a result, the loss rate of target tracking is relatively high. The disclosed methods and systems are directed to solve one or more problems set forth above and other problems.

SUMMARY

Based on the above, the present disclosure provides a target tracking method, a computer device, and a storage medium, which can resolve the problem of a relatively high loss rate of target tracking in conventional methods.

One aspect of the present disclosure includes a target tracking method for a computer device. The method includes: determining a target candidate region of a current image frame; capturing a target candidate image matching the target candidate region from the current image frame; determining a target region of the current image frame according to an image feature of the target candidate image; determining motion prediction data of a next image frame relative to the current image frame by using a motion prediction model and according to the image feature of the target candidate image; and determining a target candidate region of the next image frame according to the target region and the motion prediction data.

Another aspect of the present disclosure includes a computer device. The computer device includes a memory storing computer program instructions, and a processor coupled to the memory. When executing the computer program instructions, the processor is configured to perform: determining a target candidate region of a current image frame; capturing a target candidate image matching the target candidate region from the current image frame; determining a target region of the current image frame according to an image feature of the target candidate image; determining motion prediction data of a next image frame relative to the current image frame by using a motion prediction model and according to the image feature of the target candidate image; and determining a target candidate region of the next image frame according to the target region and the motion prediction data.

Another aspect of the present disclosure includes a non-transitory computer-readable storage medium. The non-transitory computer-readable storage medium stores computer program instructions executable by at least one processor to perform: determining a target candidate region of a current image frame; capturing a target candidate image matching the target candidate region from the current image frame; determining a target region of the current image frame according to an image feature of the target candidate image; determining motion prediction data of a next image frame relative to the current image frame by using a motion prediction model and according to the image feature of the target candidate image; and determining a target candidate region of the next image frame according to the target region and the motion prediction data.

Other aspects of the present disclosure can be understood by those skilled in the art in light of the description, the claims, and the drawings of the present disclosure.

DESCRIPTION OF EMBODIMENTS

To make the objectives, technical solutions, and advantages of the present disclosure clearer and more comprehensible, the present disclosure is further described in detail with reference to the accompanying drawings. It is to be understood that the specific embodiments described herein are merely used for describing the present disclosure, but are not intended to limit the present disclosure.

Figure 1:
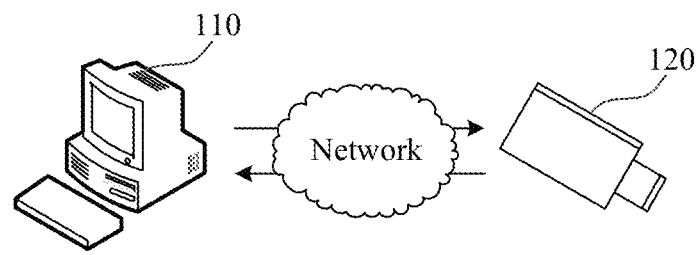
FIG. 1 is a diagram of an application scenario of a target tracking method according to an embodiment of the present disclosure.

FIG. 1 is a diagram of an application scenario of a target tracking method according to an embodiment. Referring to FIG. 1, the application scenario includes a terminal 110 and at least one camera 120. The camera is configured to capture an image. The terminal 110 may be specifically a desktop terminal or a mobile terminal. The mobile terminal may be specifically at least one of a mobile phone, a tablet computer, and a notebook computer.

Figure 2:
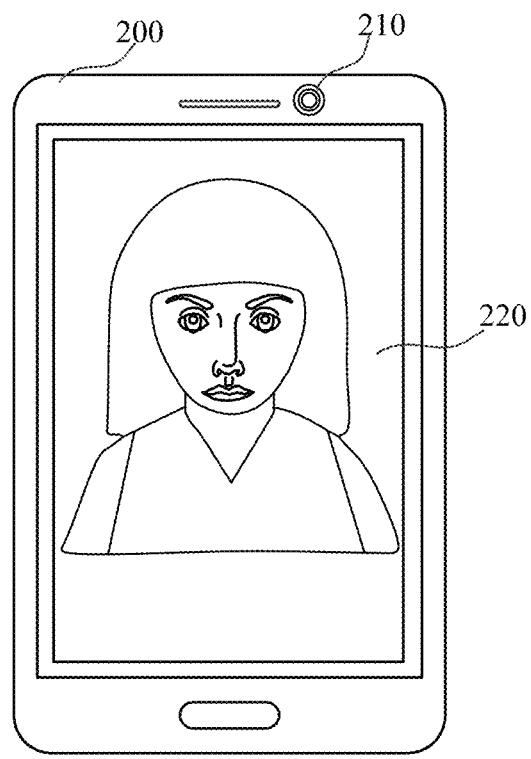
FIG. 2 is a diagram of an application scenario of a target tracking method according to another embodiment of the present disclosure.

FIG. 2 is a diagram of an application scenario of a target tracking method according to another embodiment. Referring to FIG. 2, the application scenario includes a terminal 200. The terminal 200 is a mobile terminal. The mobile terminal may be specifically at least one of a mobile phone, a tablet computer, and a notebook computer. A camera 210 is installed in the terminal 200. The camera is configured to capture an image. The terminal 200 displays an image 220 captured by the camera 210 on a display screen.

Figure 3:
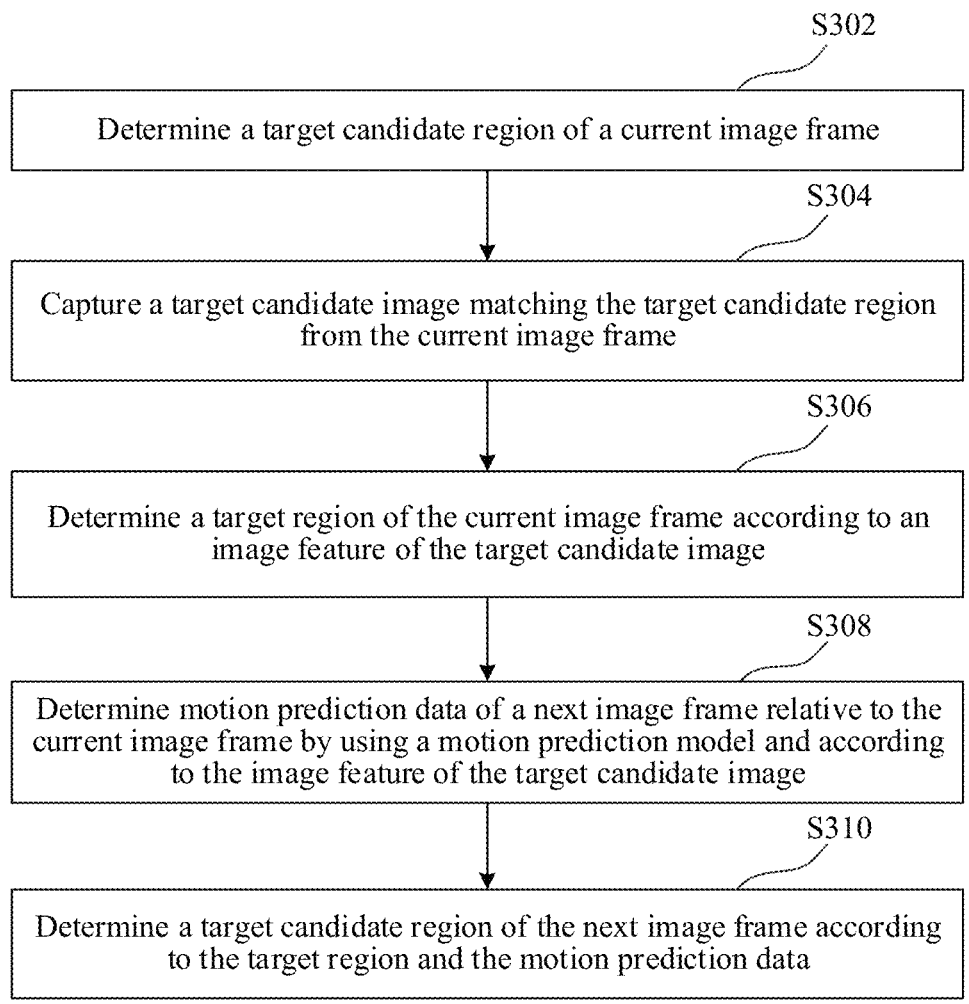
FIG. 3 is a schematic flowchart of a target tracking method according to an embodiment of the present disclosure.

As shown in FIG. 3, in an embodiment, a target tracking method is provided. The target tracking method may be applied to the terminal 110 in FIG. 1 or the terminal 200 in FIG. 2. Referring to FIG. 3, the target tracking method may include the followings.

S302: A terminal determines a target candidate region of a current image frame.

The current image frame is an image frame being processed by the terminal. An image frame is the smallest unit image of a video frame sequence that constitutes a video image. The target candidate region is a candidate region that determines a target region. The target candidate region includes the target region. A target may be moving or stationary. For example, the target may be a moving human face, a moving automobile, or a moving aircraft.

The target region may be one or more image regions in which the target is located. The target region may be represented in the form of a rectangular box.

Specifically, a camera may capture a current image frame within a current field of view in real time, and transmit the current image frame captured in real time to the terminal. The terminal receives the current image frame returned by the camera, identifies the current image frame, identifies a target prediction range in the current image frame, and determines a target candidate region of the current image frame according to the identified target position. The target prediction range is an image range in which a target may be present.

In an embodiment, the terminal obtains the current image frame within the current field of view of the camera by using the camera, calls a target identification program to identify the target in the current image frame, obtains a target position by the identification, and determines a target candidate region according to the target position.

In an embodiment, the terminal acquires the current image frame and acquires the target candidate region determined according to a target region and motion prediction data in a previous image frame. The motion prediction data may include at least one of a movement speed, a movement direction, and a movement distance.

S304: The terminal captures a target candidate image matching the target candidate region from the current image frame.

The target candidate image is a part of the image captured from the current image according to the target candidate region.

Specifically, after identifying the target candidate region in the current image frame, the terminal captures an image in the target candidate region, to obtain a target candidate image matching the target candidate region. The captured image may be determined as the target candidate image matching the target candidate region.

In an embodiment, after identifying the target candidate region in the current image frame, the terminal enlarges the target candidate region by a preset multiple, and captures a target candidate image from the current image frame according to the enlarged target candidate region.

In an embodiment, the terminal enlarges the side lengths of the target candidate region by a preset multiple, and captures a target candidate image matching the target candidate region from the current image frame according to the enlarged side lengths.

In an embodiment, S304 specifically includes: enlarging the target candidate region in the current image frame by a preset multiple; determining a target candidate image matching the enlarged target candidate region in the current image frame; and capturing the determined target candidate image from the current image frame.

Specifically, the terminal enlarges the target candidate region by a preset multiple, and determines the enlarged target candidate region in the current image frame according to the enlarged target candidate region. The terminal captures the target candidate image from the current image frame according to the determined target candidate region, the size of the captured target candidate image matching that of the determined target candidate region. The preset multiple may be specifically 1.3 times.

In an embodiment, the terminal uses each side length of the target candidate region as the center, and extends each side length of the target candidate region to both ends by a preset multiple. The terminal translates each extended side length to the outside of the target candidate region in a vertical direction until the endpoints of each side length coincide two by two, and uses a closed region formed by the side lengths as the enlarged target candidate region. The preset multiple may be specifically 1.3 times.

S306: The terminal determines a target region of the current image frame according to an image feature of the target candidate image.

The target region is the image region in which the identified target is located.

Specifically, after capturing the target candidate image, the terminal extracts the image feature from the target candidate image, performs a feature analysis according to the image feature, and determines the target region in the target candidate image through the feature analysis.

In an embodiment, the terminal inputs the target candidate image into an image feature extraction model, to obtain an image feature inputted by the image feature extraction model, inputs the acquired image feature into a target positioning model, and determines the target region of the current image frame by using the target positioning model.

S308: The terminal determines motion prediction data of a next image frame relative to the current image frame by using a motion prediction model and according to the image feature of the target candidate image.

The motion prediction data of the next image frame relative to the current image frame is data about the movement of the target predicted by using a target in the next image frame relative to the target in the current image frame. The motion prediction data includes at least one of a movement direction, a movement speed, and a movement distance. The motion prediction data may be used for representing the possible movement of the target in the next image frame relative to that in the current image frame by prediction, for example, the direction in which the target moves, the movement speed of the target, and the distance by which the target moves.

Specifically, after acquiring the image feature of the target candidate image, the terminal inputs the image feature into the motion prediction model, performs a feature analysis on the image feature by using the motion prediction model, obtains motion prediction data outputted by the motion prediction model, and uses the obtained motion prediction data as motion prediction data of the next image frame relative to the current image frame. The feature analysis may be at least one of a convolution processing, a matrix calculation and a vector calculation of the image feature.

S310: The terminal determines a target candidate region of the next image frame according to the target region and the motion prediction data.

Specifically, after determining the target region of the current image frame and the motion prediction data of the next image frame relative to the current image frame, the terminal moves the target region in the current image frame according to the motion prediction data, to obtain position information of the moved target region in the current image frame, and determines the target candidate region in the next image frame according to the obtained position information.

In an embodiment, the terminal moves the target region in the current image frame according to the motion prediction data, enlarges the moved target region by a multiple, to obtain position information of the enlarged target region, and determines the target candidate region in the next image frame according to the obtained position information.

In one embodiment, a target candidate image is captured according to a target candidate region of a current image frame, a target region is determined in the target candidate image, motion prediction data of a next image frame relative to the current image frame is determined by using a motion prediction model, and a target candidate region of the next image frame can be determined by moving the target region of the current image frame by using the motion prediction data. In this way, it can be ensured that during switching from the current image frame to the next image frame, the target candidate region can be accurately determined, thereby improving the accuracy of determining the target candidate region, and it can also be ensured that during switching to the next image frame, the target region is determined in the target candidate region, so as to improve the accuracy of target tracking, thereby reducing the loss rate of target tracking.

Figure 4:
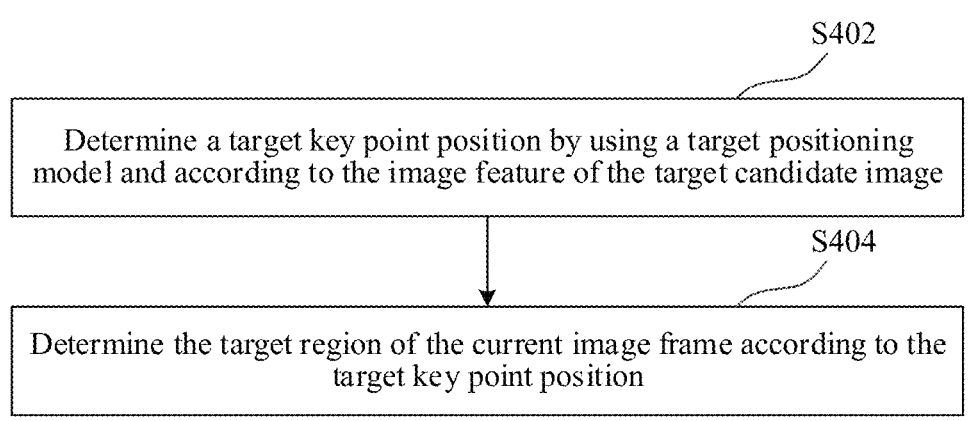
FIG. 4 is a schematic flowchart of a step of determining a target region according to an embodiment of the present disclosure.

As shown in FIG. 4, in an embodiment, S306 specifically includes a process of determining a target region. The determining process specifically includes the followings.

S402: The terminal determines a target key point position by using a target positioning model and according to the image feature of the target candidate image.

A target key point is used for determining a key point of the target. For example, in a case that the target is a human face, the target key point may be a point that marks the position of the facial features on the human face. In a case that the target is an automobile, the target key point may be points marking the profile of the automobile.

Specifically, after capturing a target candidate image, the terminal extracts the image feature from the target candidate image, inputs the extracted image feature into the target positioning model, and analyzes the image feature by using the target positioning model, to obtain a target key point position outputted by the target positioning model. The target key point position is the position of the target key point in the target candidate image.

In an embodiment, S402 specifically includes the following content: inputting the target candidate image into an image feature extraction model, acquiring an image feature outputted by the image feature extraction model, and obtaining a target key point position of the current image frame by using the image feature as an input of the target positioning model.

Specifically, the terminal inputs the target candidate image into the image feature extraction model, analyzes the target candidate image by using the image feature extraction model, to obtain an image feature of the target candidate image outputted by the image feature extraction model, inputs the obtained image feature into a target positioning model, and analyzes the image feature by using the target positioning model, to output a target key point position of the current image frame.

In an embodiment, the terminal determines a classification feature according to the image feature, and uses the classification feature as an input of the target positioning model, to obtain a target key point position of the current image frame.

S404: The terminal determines the target region of the current image frame according to the target key point position.

Specifically, after acquiring the target key point position, the terminal determines the target position in the current image frame according to the target key point position, and determines the target region according to the target position.

In one embodiment, the target key point position is determined by using the target positioning model and according to the image feature of the target candidate image, thereby improving the accuracy of the target key point position. The target region of the current image frame is determined according to the target key point position, thereby further improving the accuracy of the target region in the current image frame.

Figure 5:
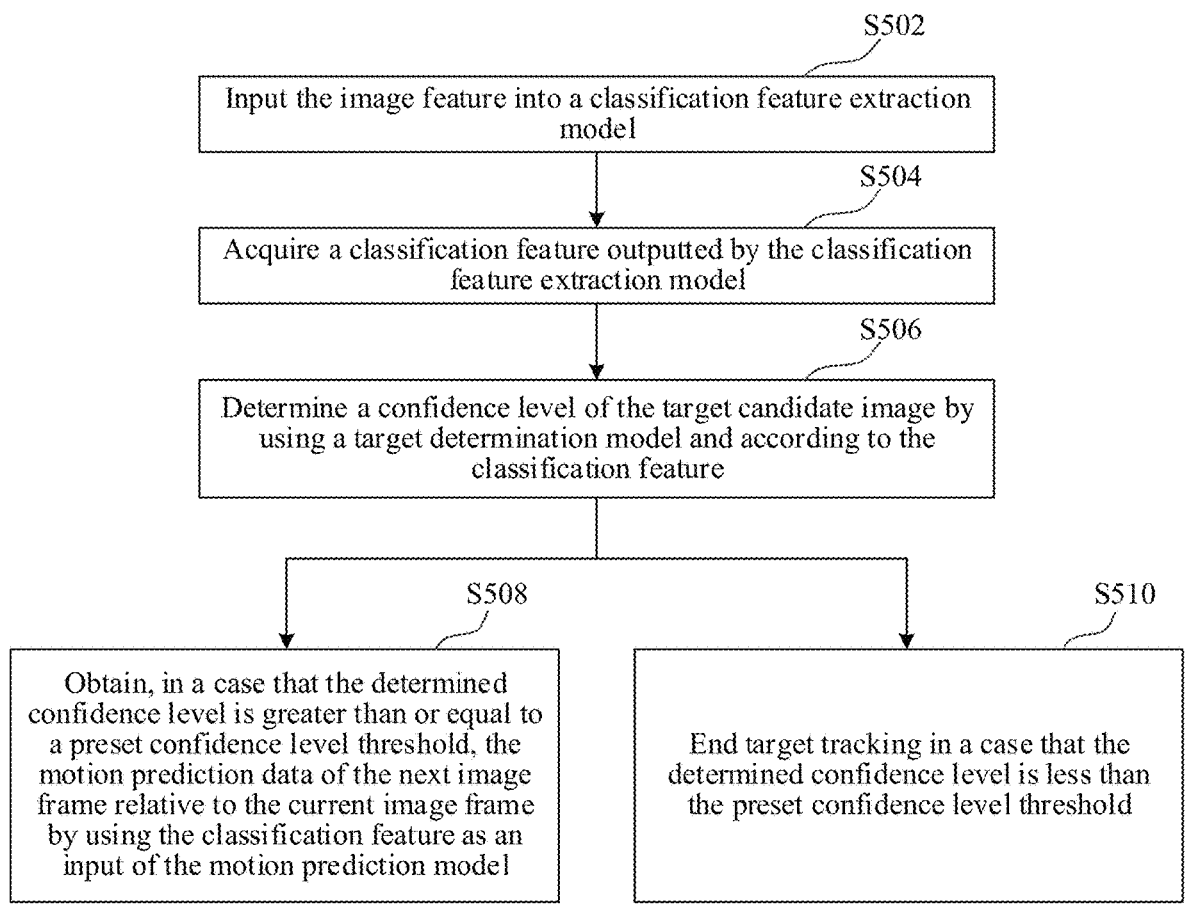
FIG. 5 is a schematic flowchart of a step of obtaining a motion prediction data according to an embodiment of the present disclosure.

As shown in FIG. 5, in an embodiment, S308 specifically further includes a process of obtaining the motion prediction data. The process specifically includes the followings.

S502: The terminal inputs the image feature into a classification feature extraction model.

Specifically, after acquiring an image feature of a target candidate image, the terminal uses the image feature as an input of the classification feature extraction model, to input the image feature into the classification feature extraction model. The classification feature extraction model is a model used for determining a classification feature according to the image feature.

S504: The terminal acquires a classification feature outputted by the classification feature extraction model.

Specifically, after receiving the inputted image feature, the classification feature extraction model analyzes the image feature to obtain the classification feature, and outputs the classification feature. The terminal acquires the classification feature outputted by the classification feature extraction model.

S506: The terminal determines a confidence level of the target candidate image by using a target determination model and according to the classification feature.

The confidence level is used for representing a probability value that a target is present in the target candidate image. The target determination model is used for determining a machine learning model of a probability that the target is present in the target candidate image.

Specifically, the terminal inputs the classification feature extracted from the classification feature extraction model into the target determination model, analyzes the classification feature by using the target determination model, and outputs the confidence level of the target candidate image.

S508: The terminal obtains, in a case that the determined confidence level is greater than or equal to a preset confidence level threshold, the motion prediction data of the next image frame relative to the current image frame by using the classification feature as an input of the motion prediction model.

Specifically, the terminal compares the determined confidence level with the preset confidence level threshold. The terminal inputs, in a case that the determined confidence level is greater than or equal to the preset confidence level threshold, the classification feature extracted by the classification feature extraction model into the motion prediction model. The motion prediction model analyzes the classification feature and outputs motion prediction data. The terminal acquires the motion prediction data outputted by the motion prediction model, to obtain the motion prediction data of the next image frame relative to the current image frame by using the acquired motion prediction data.

In an embodiment, the obtaining the motion prediction data of the next image frame relative to the current image frame by using the classification feature as an input of the motion prediction model includes: determining probability values respectively corresponding to preset prediction classes by using the motion prediction model and according to the classification feature; determining a preset prediction class corresponding to the largest probability value; and acquiring motion prediction data corresponding to the determined preset prediction class.

The preset prediction class is classified according to motion data of the target. Each preset prediction class corresponds to a unique motion prediction data.

Specifically, the terminal inputs the classification feature into the motion prediction model. The motion prediction model determines probability values respectively corresponding to preset prediction classes according to the classification feature, compares the probability values, determines the largest probability value through the comparison, selects a preset prediction class corresponding to the largest probability value, and obtains motion prediction data corresponding to the selected preset prediction class. The terminal uses the acquired motion prediction data as the motion prediction data of the next image frame relative to the current image frame.

S510: The terminal ends target tracking in a case that the determined confidence level is less than the preset confidence level threshold.

Specifically, the terminal compares the determined confidence level with the preset confidence level threshold. The target tracking is ended in a case that the determined confidence level is less than the preset confidence level threshold.

In one embodiment, an image feature is inputted into a classification feature extraction model. A classification feature is extracted by using the classification feature extraction model. The classification feature is inputted into a target determination model to determine a confidence level of a target candidate image. It is determined by using the confidence level whether there is a target in the target candidate image. In a case that there is a target in the target candidate image, that is, the determined confidence level is greater than or equal to a preset confidence level threshold, the classification feature is inputted into a motion prediction model, to obtain motion prediction data of a next image frame relative to a current image frame, so that the target can be accurately tracked, thereby improving the efficiency of target tracking.

Figure 6:
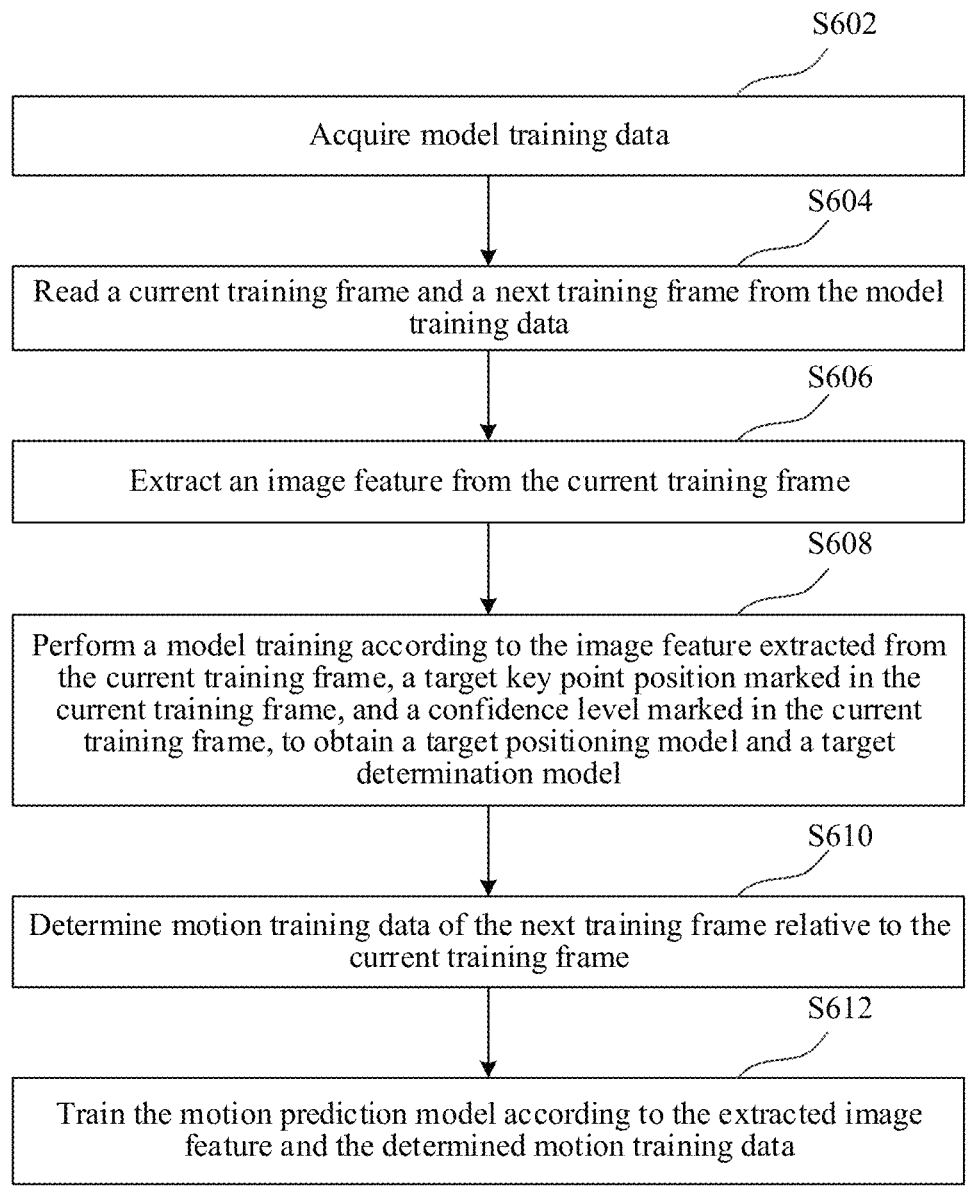
FIG. 6 is a schematic flowchart of a step of training a motion prediction model according to an embodiment of the present disclosure.

As shown in FIG. 6, in an embodiment, the target tracking method further includes a process of training a motion prediction model. The training process specifically includes the followings.

S602: A terminal acquires model training data. The model training data is sample data used for training a machine learning model.

Specifically, the terminal acquires a storage path of the model training data, and acquires the model training data according to the storage path.

In an embodiment, the terminal acquires the storage path of the model training data, generates a data acquisition request according to the storage path, and acquires the model training data from a database according to the data acquisition request.

S604: The terminal reads a current training frame and a next training frame from the model training data.

Specifically, the model training data includes successive image training frames. The terminal reads the current training frame and the next training frame from the image training frames according to the sequence of the image training frames.

S606: The terminal extracts an image feature from the current training frame.

Specifically, the model training data includes an image feature corresponding to each image training frame. After reading the current training frame, the terminal extracts the image feature corresponding to the current training frame from the model training data.

S608: The terminal performs a model training according to the image feature extracted from the current training frame, a target key point position marked in the current training frame, and a confidence level marked in the current training frame, to obtain a target positioning model and a target determination model.

The target positioning model is a model for positioning the target key point in the image frame. The target determination model is a model for determining whether there is a target in the image frame.

Specifically, the terminal extracts a target key point position and a confidence level corresponding to the current training frame from the model training data, uses the extracted target key point position as the marked target key point position, and uses the extracted confidence level as the marked confidence level. The terminal performs training by using the extracted image feature as an input of the target positioning model and using the marked target key point position as an output of the target positioning model, to obtain the target positioning model. The terminal performs training by using the extracted image feature as an input of the target determination model and using the marked confidence level as an output of the target determination model, to obtain the target determination model.

In an embodiment, the terminal determines the classification feature according to the extracted image feature, performs training by using the determined classification feature as an input of the target determination model and using the marked confidence level as an output of the target determination model, to obtain the target determination model.

In some embodiments, the above training processes may be carried out by any type of computer device including the terminal, and the model obtained through training is then sent to the terminal for use, so as to save processing resources of the terminal and ensure the normal operation of the terminal.

In an embodiment, S608 includes a process of training each model. The training process includes: performing the model training according to the current training frame and the image feature in the current training frame, to obtain an image feature extraction model; performing the model training by using the image feature in the current training frame as an input and using the target key point position marked in the current training frame as an output, to obtain the target positioning model; performing the model training by using the image feature in the current training frame as an input and using a classification feature marked in the current training frame as an output, to obtain a classification feature extraction model; and performing the model training according to the classification feature marked in the current training frame and the confidence level marked in the current training frame, to obtain the target determination model.

Specifically, the terminal performs training by using the current training frame as an input of the image feature extraction model and using the image feature in the current training frame as an output of the image feature extraction model, to obtain the image feature extraction model.

In an embodiment, the terminal performs the model training by using the image feature in the current training frame as an input of the target positioning model and using the target key point position marked in the current training frame as an output of the target positioning model, to obtain the target positioning model.

In an embodiment, the terminal performs the model training by using the image feature in the current training frame as an input of the classification feature extraction model and using the classification feature marked in the current training frame as an output of the classification feature extraction model, to obtain the classification feature extraction model.

In an embodiment, the terminal performs the model training by using the classification feature marked in the current training frame as an input of the target determination model and using the confidence level marked in the current training frame as an output of the target determination model, to obtain the target determination model.

S610: The terminal determines motion training data of the next training frame relative to the current training frame.

Specifically, the model training data includes the motion training data between two adjacent frames. After reading the current training frame and the next training frame, the terminal extracts the motion training data of the next training frame relative to the current training frame from the model training data. The motion training data includes at least one of a movement speed, a movement direction, and a movement distance.

S612: The terminal trains the motion prediction model according to the extracted image feature and the determined motion training data.

Specifically, the terminal performs the model training by using the extracted image feature as an input of the motion prediction model and using the motion training data as an output of the motion prediction model, to obtain the motion prediction model through training.

In an embodiment, the terminal determines a classification feature according to the extracted image feature, determines a preset prediction class according to the determined motion training data, performs the model training by using the determined classification feature as an input of the motion prediction model and using the determined preset prediction class as an output, to obtain the motion prediction model through training.

In an embodiment, the terminal uses L as a loss function during the training of the motion prediction model. L is shown in the following formula:

$$L = -\sum_{j=1}^{T} y_j \log s_j$$

T represents a quantity of preset prediction classes. $S_j$ represents a probability value belonging to a $j^{th}$ preset prediction class.

In one embodiment, a current training frame and a next training frame in model training data are read. An image frame in the current training frame is extracted. A model training is respectively performed according to an image feature, a marked target key point position, a marked confidence level, and motion training data of the next training frame relative to the current training frame. A motion prediction model, a target positioning model, and a target determination model are obtained through the model training. The accuracy of motion prediction data is improved through the cooperation of the motion prediction model, the target positioning model, and the target determination model, so as to accurately track a target.

Figure 7:
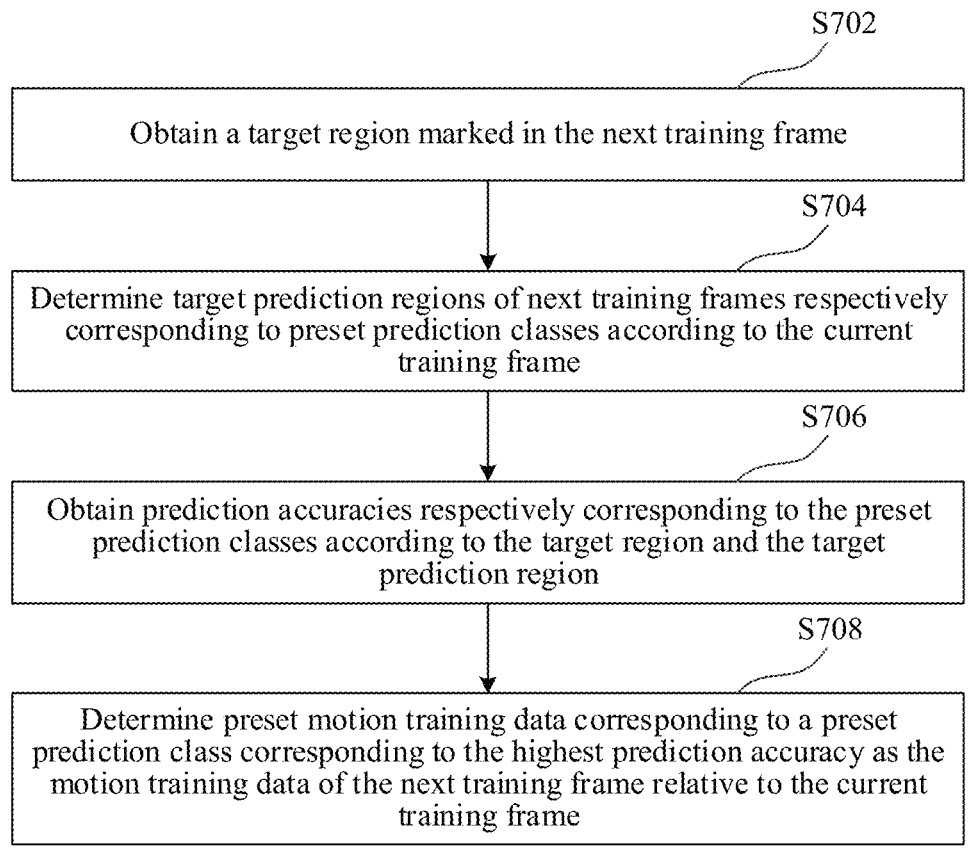
FIG. 7 is a schematic flowchart of a step of determining a motion training data according to an embodiment of the present disclosure.

As shown in FIG. 7, in an embodiment, S610 specifically further includes a process of determining the motion training data. The determining process specifically includes the followings.

S702: The terminal obtains a target region marked in the next training frame.

Specifically, the model training data includes a target region position correspondingly marked in each frame in the image frame. The terminal queries a marked target region position corresponding to the next training frame from the model training data, and determines a target region marked in the next training frame according to the target region position.

S704: The terminal determines target prediction regions of next training frames respectively corresponding to preset prediction classes according to the current training frame.

Specifically, the terminal determines a target region in the current training frame, moves the determined target region according to preset motion training data respectively corresponding to preset prediction classes, obtains the moved target region corresponding to each preset prediction class, and uses the moved target region as a target prediction region of the next training frame.

S706: The terminal obtains prediction accuracies respectively corresponding to the preset prediction classes according to the target region and the target prediction region.

Specifically, for the target prediction region and target region of the next training frame corresponding to each preset prediction class, the terminal determines an intersection area and a union area of the target prediction region and the target region in the next training frame, and divides the intersection area by the union area to obtain a prediction accuracy corresponding to the preset prediction class, so as to obtain a prediction accuracy corresponding to each preset prediction class.

In an embodiment, S706 specifically includes the following content: determining an intersection region and a union region between the target prediction region and the target region in the next training frame corresponding to each preset prediction class; and calculating an area ratio of the intersection region corresponding to each preset prediction class to the corresponding union region, to obtain the prediction accuracy corresponding to the corresponding preset prediction class.

Specifically, for the target prediction region and the target region in the next training frame corresponding to each preset prediction class, the terminal determines the intersection region and the union region between the target prediction region and the target region, and obtains an intersection region and a union region corresponding to a current preset prediction class. For the intersection region and the union region corresponding to each preset prediction class, the terminal respectively calculates the areas of the intersection region and the union region, divides the area of the intersection region by the area of the union region, to obtain an area ratio of the intersection region to the union region, and uses the area ratio corresponding to each preset prediction class as an prediction accuracy.

S708: The terminal determines the preset motion training data corresponding to a preset prediction class corresponding to the highest prediction accuracy as the motion training data of the next training frame relative to the current training frame.

Specifically, after obtaining the prediction accuracies respectively corresponding to the preset prediction classes, the terminal compares the prediction accuracies, determines the highest prediction accuracy through the comparison, determines a preset prediction class corresponding to the highest prediction accuracy, and obtains motion training data corresponding to the determined preset prediction class. The motion training data includes a movement speed and a movement direction.

In one embodiment, for a target prediction region in a next image frame corresponding to each preset prediction class, a prediction accuracy corresponding to each preset prediction class is represented according to an area ratio of an intersection region to a union region between a target region and the target prediction region of the next image frame. A preset prediction class corresponding to the highest prediction accuracy is used as the preset prediction class marked in a case that the next image frame is predicted according to a current image frame, thereby improving the accuracy of the model training data and the training accuracy of the model training data.

Figure 8:
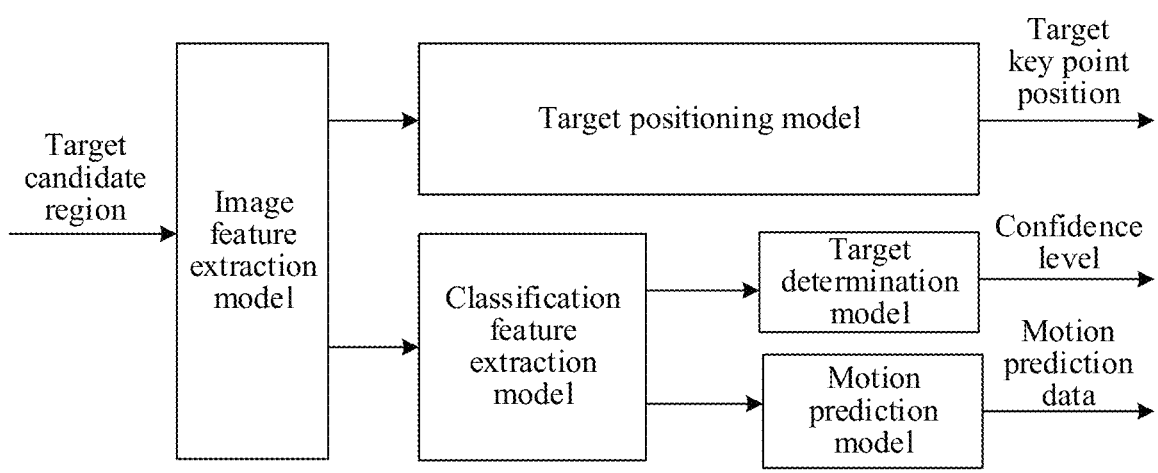
FIG. 8 is a schematic diagram of connection of a model in a target tracking method according to an embodiment of the present disclosure.

FIG. 8 is a schematic diagram of connection of a model in a target tracking method according to an embodiment. Referring to FIG. 8, an image feature extraction model is respectively connected to a target positioning model and a classification feature extraction model. The classification feature extraction model is respectively connected to a target determination model and a motion prediction model.

The image feature extraction model receives an inputted target candidate image of a current image frame, extracts an image feature from the target candidate image, and respectively inputs the image feature into the target positioning model and the classification feature extraction model. The target positioning model outputs a target key point position according to the image feature. The classification feature extraction model outputs a classification feature according to the image feature, and respectively inputs the classification feature into the target determination model and the motion prediction model. The target determination model outputs a confidence level according to the classification feature. The motion prediction model outputs motion prediction data of a next image frame relative to the current image frame according to the classification feature.

Figure 9:
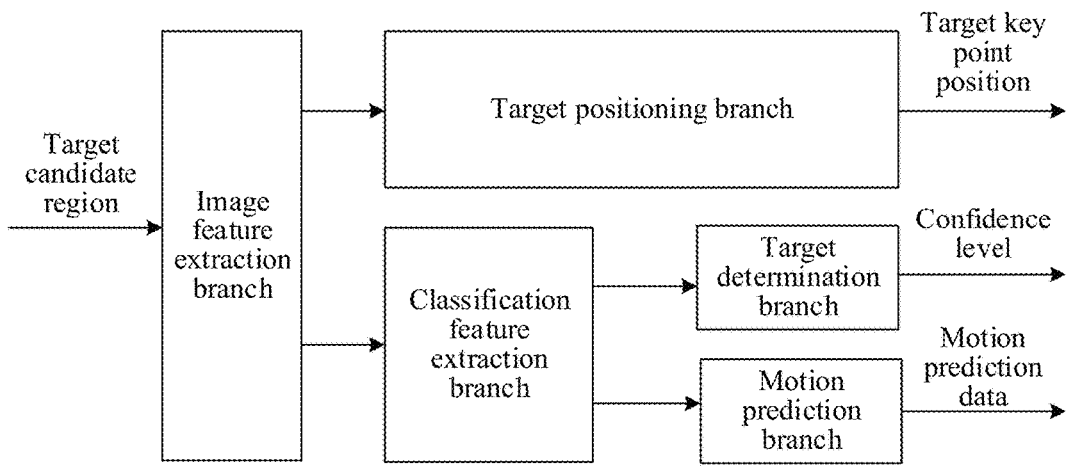
FIG. 9 is a schematic structural diagram of a multi-task model according to an embodiment of the present disclosure.

FIG. 9 is a schematic structural diagram of a multi-task model according to an embodiment. Referring to FIG. 9, the multi-task model is formed by an image feature extraction branch, a target positioning branch, a classification feature extraction branch, a target determination branch, and motion prediction branch. The image feature extraction branch is respectively connected to the target positioning branch and the classification feature extraction branch. The classification feature extraction branch is respectively connected to the target determination branch and a motion prediction branch.

The image feature extraction branch is formed by an image feature extraction model. The target positioning branch is formed by a target positioning model. The classification feature extraction branch is formed by a classification feature extraction model. The target determination branch is formed by a target determination model. The motion prediction branch is formed by a motion prediction model.

In a case that the multi-task model receives a target candidate image of a current image frame, the target candidate image is inputted into the image feature extraction branch, and the image feature extraction branch receives the inputted target candidate image of the current image frame, extracts an image feature from the target candidate image, and respectively inputs the image feature input into the target positioning branch and the classification feature extraction branch. The target positioning branch outputs a target key point position according to the image feature. The classification feature extraction branch outputs a classification feature according to the image feature, and respectively inputs the classification feature into the target determination branch and the motion prediction branch. The target determination branch outputs a confidence level according to the classification feature. The motion prediction branch outputs motion prediction data of a next image frame relative to the current image frame according to the classification feature. The multi-task model outputs the motion prediction data generated by the motion prediction branch.

Figure 10:
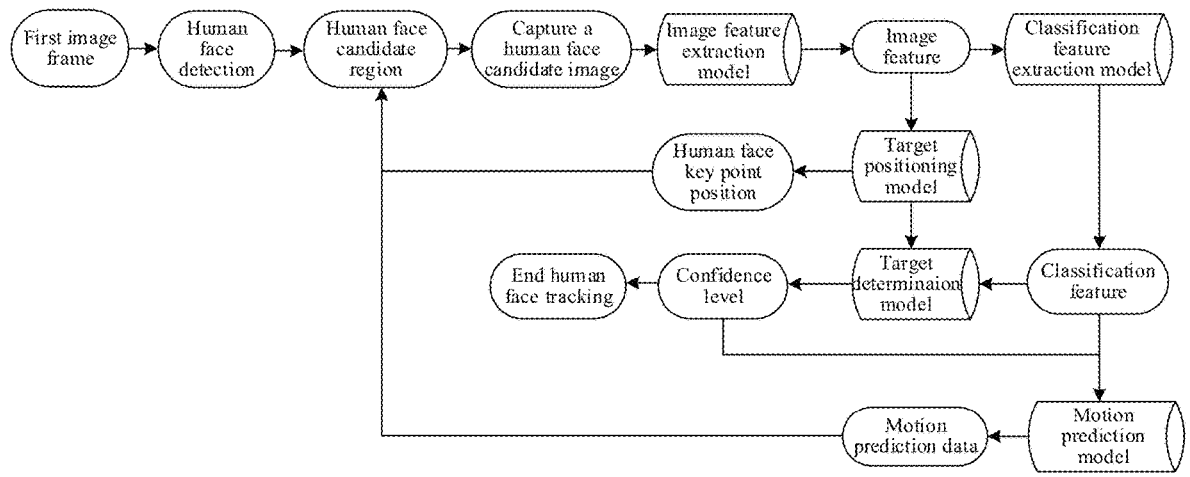
FIG. 10 is a schematic flowchart of a target tracking method according to an embodiment of the present disclosure.

FIG. 10 is a schematic flowchart of a target tracking method according to an embodiment. Referring to FIG. 10, a target is a human face, a target candidate region is a human face candidate region, a target candidate image is a human face candidate image, and a target key point position is a human face key point position.

In a case that the first image frame is used as a current image frame, a terminal performs human face detection in the current image frame, determines the human face candidate region through the human face detection, captures the human face candidate image according to the human face candidate region, and inputs the human face candidate image into an image feature extraction model. The image feature extraction model extracts an image feature, and respectively inputs the image feature into a target positioning model and a classification feature extraction model. The target positioning model outputs the human face key point position according to the image feature. The classification feature extraction model outputs a classification feature according to the image feature, and inputs the classification feature into a target determination model. The target determination model outputs a confidence level according to the classification feature, and ends target tracking in a case that the confidence level is less than a preset confidence level threshold. In a case that the confidence level is greater than or equal to the preset confidence level threshold, the classification feature extraction model inputs the classification feature into a motion prediction model. The motion prediction model outputs motion prediction data of a next image frame relative to the current image frame according to the classification feature. The terminal determines a human face candidate region of the next image frame according to the human face key point position of the current image frame and motion prediction data of the next image frame relative to the current image frame. The terminal uses the next image frame as the current image frame, and returns to capture the human face candidate image according to the human face candidate region, until the target tracking is ended.

Figure 11:
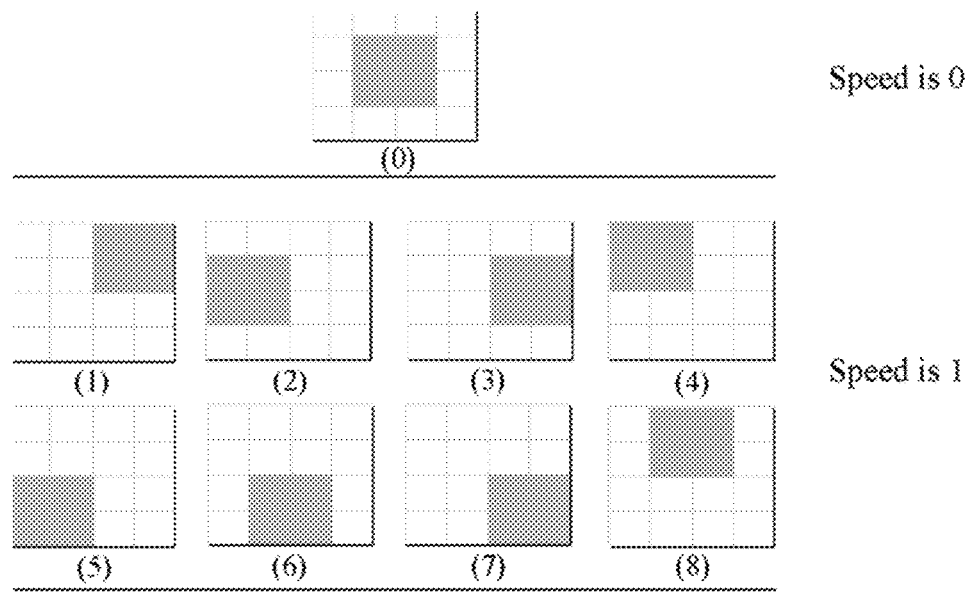
FIG. 11 is a schematic diagram of marking a preset prediction class according to an embodiment of the present disclosure.

FIG. 11 is a schematic diagram of marking a preset prediction class according to an embodiment. In FIG. 11, a gray region identifies a target candidate region. The movement speed of the target candidate region in a next image frame relative to a current image frame is 0 and is marked as a preset prediction class 0. The movement speed of the target candidate region in the next image frame relative to the current image frame is 1, and preset prediction classes in eight movement directions are respectively marked as preset prediction classes 1 to 8.

Figure 12:
FIG. 12 is a schematic diagram of determining a preset prediction class of an image frame according to an embodiment of the present disclosure.

FIG. 12 is a schematic diagram of determining a preset prediction class of an image frame according to an embodiment. For the image frame in FIG. 12, the movement direction is to the right, and the movement speed is 1. Based on the preset prediction class marked in FIG. 10, it may be determined that the preset prediction class of the image frame in FIG. 12 is 3.

Figure 13:
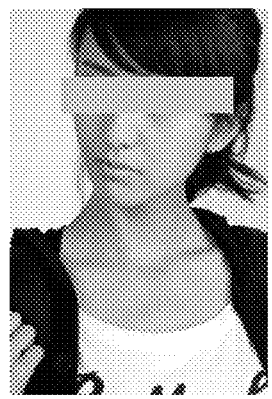
FIG. 13 is a schematic diagram of determining a preset prediction class of an image frame according to another embodiment of the present disclosure.

FIG. 13 is a schematic diagram of determining a preset prediction class of an image frame according to another embodiment. The movement speed corresponding to the image frame in FIG. 13 is 0. Based on the preset prediction class marked in FIG. 11, it may be determined that the preset prediction class of the image frame in FIG. 13 is 0.

Figure 14:
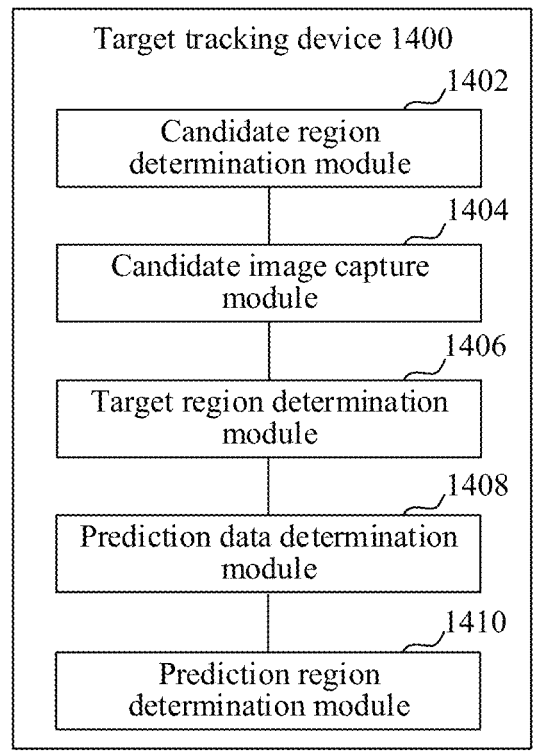
FIG. 14 is a block diagram of a target tracking device according to an embodiment of the present disclosure.

As shown in FIG. 14, in an embodiment, a target tracking device 1400 is provided. The device specifically includes the following content: a candidate region determination module 1402, a candidate image capture module 1404, a target region determination module 1406, a prediction data determination module 1408, and a prediction region determination module 1410.

The candidate region determination module 1402 is configured to determine a target candidate region of a current image frame.

The candidate image capture module 1404 is configured to capture a target candidate image matching the target candidate region from the current image frame.

The target region determination module 1406 is configured to determine a target region of the current image frame according to an image feature of the target candidate image.

The prediction data determination module 1408 is configured to determine motion prediction data of a next image frame relative to the current image frame by using a motion prediction model and according to the image feature of the target candidate image.

The prediction region determination module 1410 is configured to determine a target candidate region of the next image frame according to the target region and the motion prediction data.

In one embodiment, a target candidate image is captured according to a target candidate region of a current image frame, a target region is determined in the target candidate image, motion prediction data of a next image frame relative to the current image frame is determined by using a motion prediction model, and a target candidate region of the next image frame can be determined by moving the target region of the current image frame by using the motion prediction data. In this way, it can be ensured that during switching from the current image frame to the next image frame, the target candidate region can be accurately determined, thereby improving the accuracy of determining the target candidate region, and it can also be ensured that during switching to the next image frame, the target region is determined in the target candidate region, so as to improve the accuracy of target tracking, thereby reducing the loss rate of target tracking.

In an embodiment, the candidate image capture module 1404 is further configured to: enlarge the target candidate region in the current image frame by a preset multiple, determine a target candidate image matching the enlarged target candidate region in the current image frame, and capture the determined target candidate image from the current image frame.

In an embodiment, the target region determination module 1406 is further configured to: determine a target key point position by using a target positioning model and according to the image feature of the target candidate image, and determine the target region of the current image frame according to the target key point position.

In an embodiment, the target region determination module 1406 is further configured to: input the target candidate image into an image feature extraction model, acquire an image feature outputted by the image feature extraction model, and obtain a target key point position of the current image frame by using the image feature as an input of the target positioning model.

In one embodiment, the target key point position is determined by using the target positioning model and according to the image feature of the target candidate image, thereby improving the accuracy of the target key point position. The target region of the current image frame is determined according to the target key point position, thereby further improving the accuracy of the target region in the current image frame.

In an embodiment, the prediction data determination module 1408 is further configured to: input the image feature into a classification feature extraction model, acquire a classification feature outputted by the classification feature extraction model, and obtain the motion prediction data of the next image frame relative to the current image frame by using the classification feature as an input of the motion prediction model.

In an embodiment, the prediction data determination module 1408 is further configured to: determine a confidence level of the target candidate image by using a target determination model and according to the classification feature, perform a step of obtaining the motion prediction data of the next image frame relative to the current image frame by using the classification feature as an input of the motion prediction model in a case that the determined confidence level is greater than or equal to a preset confidence level threshold, and end target tracking in a case that the determined confidence level is less than the preset confidence level threshold.

In an embodiment, the prediction data determination module 1408 is further configured to: determine probability values respectively corresponding to preset prediction classes by using the motion prediction model and according to the classification feature, determine a preset prediction class corresponding to the largest probability value, and acquire motion prediction data corresponding to the determined preset prediction class.

In one embodiment, an image feature is inputted into a classification feature extraction model. A classification feature is extracted by using the classification feature extraction model. The classification feature is inputted into a target determination model to determine a confidence level of a target candidate image. It is determined by using the confidence level whether there is a target in the target candidate image. In a case that there is a target in the target candidate image, that is, the determined confidence level is greater than or equal to a preset confidence level threshold, the classification feature is inputted into a motion prediction model, to obtain motion prediction data of a next image frame relative to a current image frame, so that the target can be accurately tracked, thereby improving the efficiency of target tracking.

Figure 15:
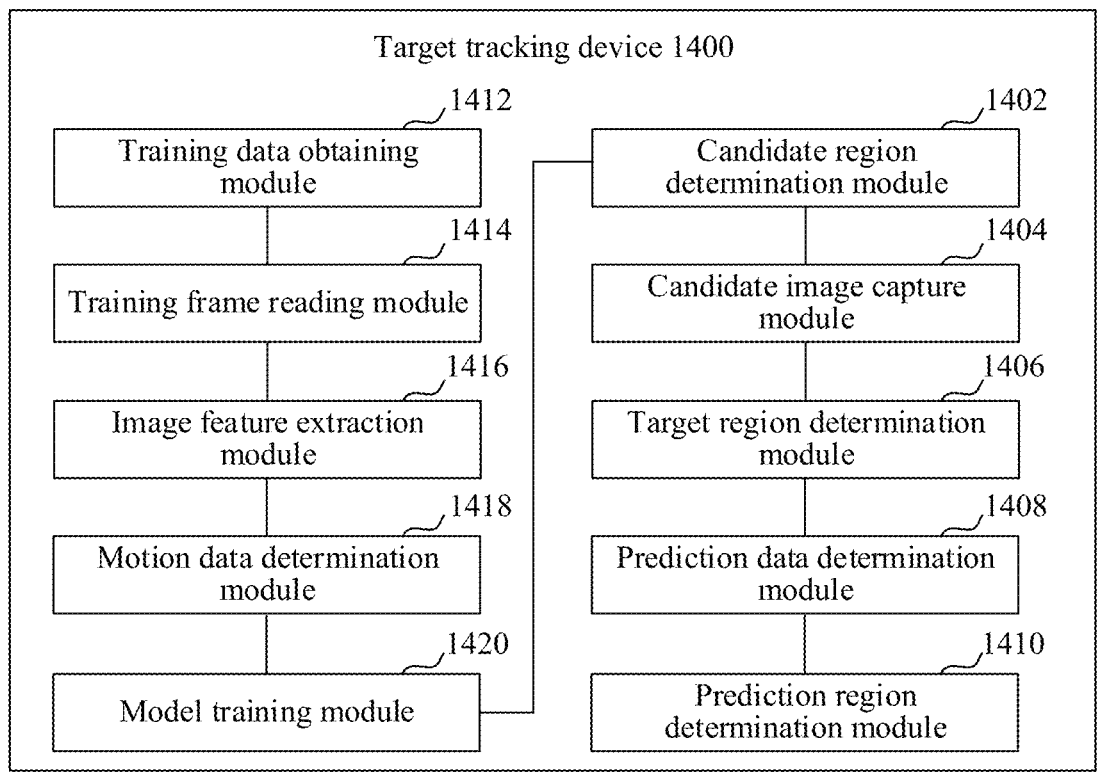
FIG. 15 is a block diagram of a target tracking device according to another embodiment of the present disclosure.

As shown in FIG. 15, in an embodiment, the target tracking device 1400 specifically further includes a training data obtaining module 1412, a training frame reading module 1414, an image feature extraction module 1416, a motion data determination module 1418, and a model training module 1420.

The training data obtaining module 1412 is configured to obtain model training data.

The training frame reading module 1414 is configured to read a current training frame and a next training frame from the model training data.

The image feature extraction module 1416 is configured to extract an image feature from the current training frame.

The motion data determination module 1418 is configured to determine motion training data of the next training frame relative to the current training frame.

The model training module 1420 is configured to train the motion prediction model according to the extracted image feature and the determined motion training data.

In one embodiment, a current training frame and a next training frame in model training data are read. An image frame in the current training frame is extracted. A model training is respectively performed according to an image feature, a marked target key point position, a marked confidence level, and motion training data of the next training frame relative to the current training frame. A motion prediction model, a target positioning model, and a target determination model are obtained through the model training. The accuracy of motion prediction data is improved through the cooperation of the motion prediction model, the target positioning model, and the target determination model, so as to accurately track a target.

In an embodiment, the model training module 1420 is further configured to perform a model training according to the image feature extracted from the current training frame, a target key point position marked in the current training frame, and a confidence level marked in the current training frame, to obtain a target positioning model and a target determination model.

In an embodiment, the model training module 1420 is further configured to: perform the model training according to the current training frame and the image feature in the current training frame, to obtain an image feature extraction model; perform the model training by using the image feature in the current training frame as an input and using the target key point position marked in the current training frame as an output, to obtain the target positioning model; perform the model training by using the image feature in the current training frame as an input and using a classification feature marked in the current training frame as an output, to obtain a classification feature extraction model; and perform the model training according to the classification feature marked in the current training frame and the confidence level marked in the current training frame, to obtain the target determination model.

In an embodiment, the motion data determination module 1418 is further configured to: obtain a target region marked in the next training frame, determine target prediction regions of next training frames respectively corresponding to preset prediction classes according to the current training frame, obtain prediction accuracies respectively corresponding to the preset prediction classes according to the target region and the target prediction region, and determine preset motion training data corresponding to a preset prediction class corresponding to the highest prediction accuracy as the motion training data of the next training frame relative to the current training frame.

In an embodiment, the motion data determination module 1418 is further configured to: determine an intersection region and a union region between the target prediction region and the target region in the next training frame corresponding to each preset prediction class; and calculate an area ratio of the intersection region corresponding to each preset prediction class to the corresponding union region, to obtain the prediction accuracy corresponding to the corresponding preset prediction class.

In one embodiment, for a target prediction region in a next image frame corresponding to each preset prediction class, a prediction accuracy corresponding to each preset prediction class is represented according to an area ratio of an intersection region to a union region between a target region and the target prediction region of the next image frame. A preset prediction class corresponding to the highest prediction accuracy is used as the preset prediction class marked in a case that the next image frame is predicted according to a current image frame, thereby improving the accuracy of the model training data and the training accuracy of the model training data.

Figure 16:
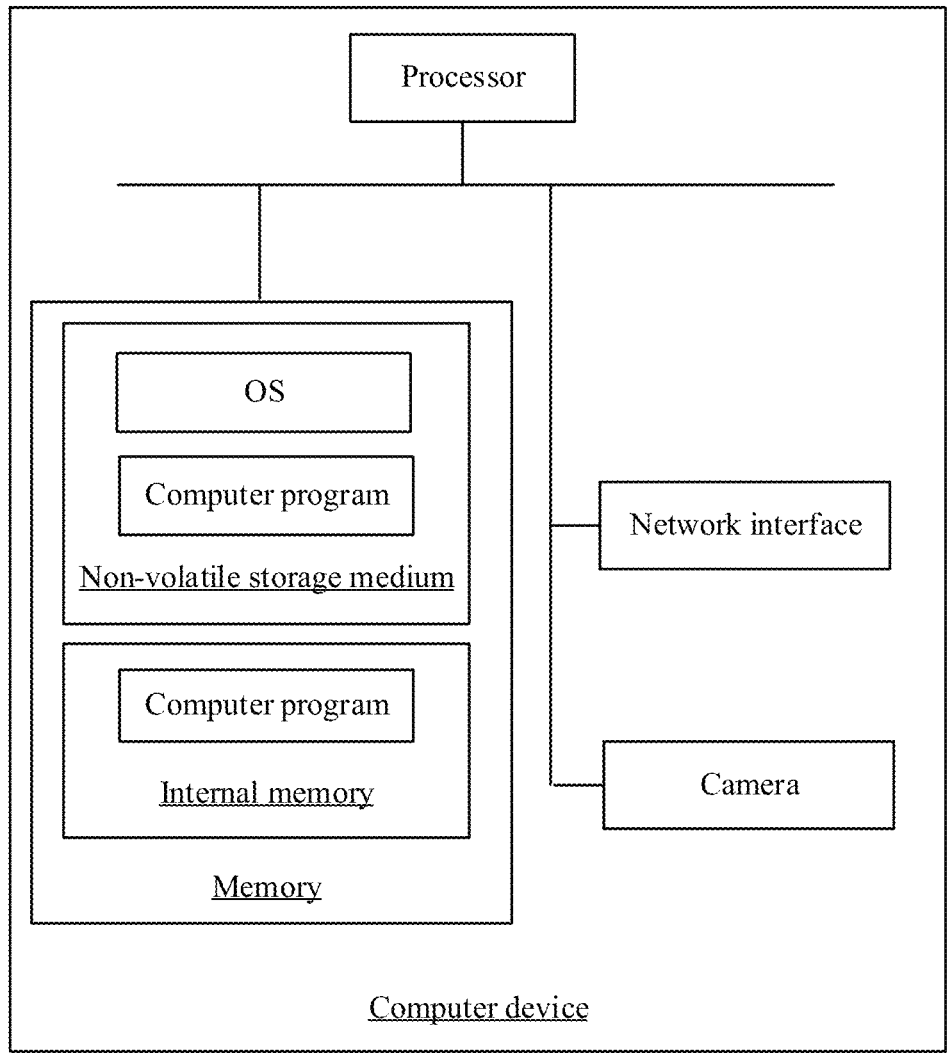
FIG. 16 is a schematic diagram of an internal structure of a computer device according to an embodiment of the present disclosure.

FIG. 16 is a schematic diagram of an internal structure of a computer device according to an embodiment. Referring to FIG. 16, the computer device may be the terminal 200 shown in FIG. 2. The computer device includes a processor, a memory, a camera, and a network interface that are connected by a system bus. The memory includes a non-volatile storage medium and an internal memory. The non-volatile storage medium of the computer device may store an operating system (OS) and a computer program. The computer program, when executed, may cause the processor to perform a target tracking method. The processor of the computer device is configured to provide calculation and control capabilities, to support the running of the entire computer device. The internal memory may store a computer program. The computer program, when executed by the processor, may cause the processor to perform the target tracking method. The network interface of the computer device is configured to perform network communication. The camera is configured to capture an image.

A person skilled in the art may understand that, the structure shown in FIG. 16 is merely a block diagram of a partial structure related to the solution in the present disclosure, and does not limit the computer device or a robot to which the solution of the present disclosure is applied. Specifically, the specific computer device may include more or fewer components than those shown in the figure, or some components may be combined, or a different component deployment may be used.

In an embodiment, the target tracking device 1400 provided in the present disclosure may be implemented in the form of a computer program. The computer program may run on the computer device shown in FIG. 16. The memory of the computer device may store program modules forming the target tracking device, for example, the candidate region determination module 1402, the candidate image capture module 1404, the target region determination module 1406, the prediction data determination module 1408, and the prediction region determination module 1410 shown in FIG. 14. The computer program formed by the program modules causes the processor to perform the steps in the target tracking method in the embodiments of the present disclosure described in this specification.

For example, the computer device shown in FIG. 16 may determine a target candidate region of a current image frame by using the candidate region determination module 1402 in the target tracking device 1400 shown in FIG. 14. The computer device may capture, by using the candidate image capture module 1404, a target candidate image matching the target candidate region from the current image frame. The computer device may determine, by using the target region determination module 1406, a target region of the current image frame according to an image feature of the target candidate image. The computer device may determine, by using the prediction data determination module 1408, motion prediction data of a next image frame relative to the current image frame by using a motion prediction model and according to the image feature of the target candidate image. The computer device may determine, by using the prediction region determination module 1410, a target candidate region of the next image frame according to the target region and the motion prediction data.

A computer device includes a memory and a processor, a computer program being stored in the memory, the computer program, when executed by the processor, causes the processor to perform the following steps: determining a target candidate region of a current image frame; capturing a target candidate image matching the target candidate region from the current image frame; determining a target region of the current image frame according to an image feature of the target candidate image; determining motion prediction data of a next image frame relative to the current image frame by using a motion prediction model and according to the image feature of the target candidate image; and determining a target candidate region of the next image frame according to the target region and the motion prediction data.

In an embodiment, the processor further performs: enlarging the target candidate region in the current image frame by a preset multiple; determining a target candidate image matching the enlarged target candidate region in the current image frame; and capturing the determined target candidate image from the current image frame.

In an embodiment, the processor further performs: determining a target key point position by using a target positioning model and according to the image feature of the target candidate image; and determining the target region of the current image frame according to the target key point position.

In an embodiment, the processor further performs: the determining the target key point position by using the target positioning model and according to the image feature of the target candidate image includes: inputting the target candidate image into an image feature extraction model; obtaining an image feature outputted by the image feature extraction model; and obtaining a target key point position of the current image frame by using the image feature as an input of the target positioning model.

In an embodiment, the processor further performs: inputting the image feature into a classification feature extraction model; acquiring a classification feature outputted by the classification feature extraction model; and obtaining the motion prediction data of the next image frame relative to the current image frame by using the classification feature as an input of the motion prediction model.

In an embodiment, after the classification feature outputted by the classification feature extraction model is acquired, the computer program, when executed by the processor, causes the processor to further perform the following steps: determining a confidence level of the target candidate image by using a target determination model and according to the classification feature; performing a step of obtaining the motion prediction data of the next image frame relative to the current image frame by using the classification feature as an input of the motion prediction model in a case that the determined confidence level is greater than or equal to a preset confidence level threshold; and ending target tracking in a case that the determined confidence level is less than the preset confidence level threshold.

In an embodiment, the processor further performs: determining probability values respectively corresponding to preset prediction classes by using the motion prediction model and according to the classification feature; determining a preset prediction class corresponding to the largest probability value; and acquiring the motion prediction data corresponding to the determined preset prediction class.

In an embodiment, the computer program, when executed by the processor, causes the processor to further perform the following steps: obtaining model training data; reading a current training frame and a next training frame from the model training data; extracting an image feature from the current training frame; determining motion training data of the next training frame relative to the current training frame; and training the motion prediction model according to the extracted image feature and the determined motion training data.

In an embodiment, after the image feature is extracted from the current training frame, the computer program, when executed by the processor, causes the processor to further perform the following steps: performing a model training according to the image feature extracted from the current training frame, a target key point position marked in the current training frame, and a confidence level marked in the current training frame, to obtain a target positioning model and a target determination model.

In an embodiment, the processor further performs: performing the model training according to the current training frame and the image feature in the current training frame, to obtain an image feature extraction model; performing the model training by using the image feature in the current training frame as an input and using the target key point position marked in the current training frame as an output, to obtain the target positioning model; performing the model training by using the image feature in the current training frame as an input and using a classification feature marked in the current training frame as an output, to obtain a classification feature extraction model; and performing the model training according to the classification feature marked in the current training frame and the confidence level marked in the current training frame, to obtain the target determination model.

In an embodiment, the processor further performs: obtaining a target region marked in the next training frame; determining target prediction regions of next training frames respectively corresponding to preset prediction classes according to the current training frame; obtaining prediction accuracies respectively corresponding to the preset prediction classes according to the target region and the target prediction region; and determining preset motion training data corresponding to a preset prediction class corresponding to the highest prediction accuracy as the motion training data of the next training frame relative to the current training frame.

In an embodiment, the processor further performs: determining an intersection region and a union region between the target prediction region and the target region in the next training frame corresponding to each preset prediction class; and calculating an area ratio of the intersection region corresponding to each preset prediction class to the corresponding union region, to obtain the prediction accuracy corresponding to the corresponding preset prediction class.

In one embodiment, a target candidate image is captured according to a target candidate region of a current image frame, a target region is determined in the target candidate image, motion prediction data of a next image frame relative to the current image frame is determined by using a motion prediction model, and a target candidate region of the next image frame can be determined by moving the target region of the current image frame by using the motion prediction data. In this way, it can be ensured that during switching from the current image frame to the next image frame, the target candidate region can be accurately determined, thereby improving the accuracy of determining the target candidate region, and it can also be ensured that during switching to the next image frame, the target region is determined in the target candidate region, so as to improve the accuracy of target tracking, thereby reducing the loss rate of target tracking.

A storage medium stores a computer program, the computer program, when executed by the processor, causing the processor to perform the following steps: determining a target candidate region of a current image frame; capturing a target candidate image matching the target candidate region from the current image frame; determining a target region of the current image frame according to an image feature of the target candidate image; determining motion prediction data of a next image frame relative to the current image frame by using a motion prediction model and according to the image feature of the target candidate image; and determining a target candidate region of the next image frame according to the target region and the motion prediction data.

In an embodiment, the capturing a target candidate image matching the target candidate region from the current image frame includes: enlarging the target candidate region in the current image frame by a preset multiple; determining a target candidate image matching the enlarged target candidate region in the current image frame; and capturing the determined target candidate image from the current image frame.

In an embodiment, the determining a target region of the current image frame according to an image feature of the target candidate image, includes: determining a target key point position by using a target positioning model and according to the image feature of the target candidate image; and determining the target region of the current image frame according to the target key point position.

In an embodiment, the determining the target key point position by using the target positioning model and according to the image feature of the target candidate image includes: inputting the target candidate image into an image feature extraction model; obtaining an image feature outputted by the image feature extraction model; and obtaining a target key point position of the current image frame by using the image feature as an input of the target positioning model.

In an embodiment, the determining motion prediction data of a next image frame relative to the current image frame by using a motion prediction model and according to the image feature of the target candidate image includes: inputting the image feature into the classification feature extraction model; acquiring a classification feature outputted by the classification feature extraction model; and obtaining motion prediction data of the next image frame relative to the current image frame by using the classification feature as an input of the motion prediction model.

In an embodiment, after the classification feature outputted by the classification feature extraction model is acquired, the computer program, when executed by the processor, causes the processor to further perform the following steps: determining a confidence level of the target candidate image by using a target determination model and according to the classification feature; performing a step of obtaining the motion prediction data of the next image frame relative to the current image frame by using the classification feature as an input of the motion prediction model in a case that the determined confidence level is greater than or equal to a preset confidence level threshold; and ending target tracking in a case that the determined confidence level is less than the preset confidence level threshold.

In an embodiment, the obtaining the motion prediction data of the next image frame relative to the current image frame by using the classification feature as an input of the motion prediction model includes: determining probability values respectively corresponding to preset prediction classes by using the motion prediction model and according to the classification feature; determining a preset prediction class corresponding to the largest probability value; and acquiring the motion prediction data corresponding to the determined preset prediction class.

In an embodiment, the computer program, when executed by the processor, causes the processor to further perform the following steps: obtaining model training data; reading a current training frame and a next training frame from the model training data; extracting an image feature from the current training frame; determining motion training data of the next training frame relative to the current training frame; and training the motion prediction model according to the extracted image feature and the determined motion training data.

In an embodiment, after the image feature is extracted from the current training frame, the computer program, when executed by the processor, causes the processor to further perform the following steps: performing a model training according to the image feature extracted from the current training frame, a target key point position marked in the current training frame, and a confidence level marked in the current training frame, to obtain a target positioning model and a target determination model.

In an embodiment, the performing a model training according to the image feature extracted from the current training frame, a target key point position marked in the current training frame, and a confidence level marked in the current training frame, to obtain a target positioning model and a target determination model includes: performing the model training according to the current training frame and the image feature in the current training frame, to obtain an image feature extraction model; performing the model training by using the image feature in the current training frame as an input and using the target key point position marked in the current training frame as an output, to obtain the target positioning model; performing the model training by using the image feature in the current training frame as an input and using a classification feature marked in the current training frame as an output, to obtain a classification feature extraction model; and performing the model training according to the classification feature marked in the current training frame and the confidence level marked in the current training frame, to obtain the target determination model.

In an embodiment, the determining motion training data of the next training frame relative to the current training frame includes: obtaining a target region marked in the next training frame; determining target prediction regions of next training frames respectively corresponding to preset prediction classes according to the current training frame; obtaining prediction accuracies respectively corresponding to the preset prediction classes according to the target region and the target prediction region; and determining preset motion training data corresponding to a preset prediction class corresponding to the highest prediction accuracy as the motion training data of the next training frame relative to the current training frame.

In an embodiment, the obtaining prediction accuracies respectively corresponding to the preset prediction classes according to the target region and the target prediction region includes: determining an intersection region and a union region between the target prediction region and the target region in the next training frame corresponding to each preset prediction class; and calculating an area ratio of the intersection region corresponding to each preset prediction class to the corresponding union region, to obtain the prediction accuracy corresponding to the corresponding preset prediction class.

In one embodiment, a target candidate image is captured according to a target candidate region of a current image frame, a target region is determined in the target candidate image, motion prediction data of a next image frame relative to the current image frame is determined by using a motion prediction model, and a target candidate region of the next image frame can be determined by moving the target region of the current image frame by using the motion prediction data. In this way, it can be ensured that during switching from the current image frame to the next image frame, the target candidate region can be accurately determined, thereby improving the accuracy of determining the target candidate region, and it can also be ensured that during switching to the next image frame, the target region is determined in the target candidate region, so as to improve the accuracy of target tracking, thereby reducing the loss rate of target tracking.

A person of ordinary skill in the art may understand that all or some of the processes of the methods in the foregoing embodiments may be implemented by a computer program instructing relevant hardware. The program may be stored in a non-volatile computer-readable storage medium. When the program is executed, the processes of the foregoing method embodiments are included. Any reference to a memory, a storage, a database, or another medium used in the various embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache memory. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a rambus direct RAM (RDRAM), a direct rambus dynamic RAM (DRDRAM), and a rambus dynamic RAM (DRAM).

Various technical features in the foregoing embodiments may be combined randomly. For a concise description, possible combinations of various technical features in the foregoing embodiments are not all described. However, the combinations of the technical features is to be considered as falling within the scope recorded in this specification provided that the combinations of the technical features do not conflict with each other.

The foregoing embodiments merely describe several implementations of the present disclosure, which are described specifically and in detail, but cannot be construed as limitation to the patent scope of the present disclosure. A person of ordinary skill in the art may further make variations and improvements without departing from the ideas of the present disclosure, and the variations and improvements shall fall within the protection scope of the present disclosure. Therefore, the protection scope of the present disclosure shall be subject to the protection scope of the appended claims.

What is claimed is:

1. A target tracking method for a computer device, comprising:
    determining a target candidate region of a current image frame;
    capturing a target candidate image matching the target candidate region from the current image frame;
    determining a target key point position by using a target positioning model and according to an image feature of the target candidate image;
    determining a target region of the current image frame according to the target key point position;
    determining motion prediction data of a next image frame relative to the current image frame by using a motion prediction model and according to the image feature of the target candidate image; and
    determining a target candidate region of the next image frame according to the target region and the motion prediction data.

2. The method according to claim 1, wherein the capturing a target candidate image matching the target candidate region from the current image frame comprises:
    enlarging the target candidate region in the current image frame by a preset multiple;
    determining a target candidate image matching the enlarged target candidate region in the current image frame; and capturing the determined target candidate image from the current image frame.

3. The method according to claim 1, wherein the determining a target key point position by using a target positioning model and according to the image feature of the target candidate image comprises:

inputting the target candidate image into an image feature extraction model;

acquiring an image feature outputted by the image feature extraction model; and obtaining a target key point position of the current image frame by using the image feature as an input of the target positioning model.

4. The method according to claim 3, wherein the determining motion prediction data of a next image frame relative to the current image frame by using a motion prediction model and according to the image feature of the target candidate image comprises:

inputting the image feature into a classification feature extraction model;

acquiring a classification feature outputted by the classification feature extraction model; and obtaining the motion prediction data of the next image frame relative to the current image frame by using the classification feature as an input of the motion prediction model.

5. The method according to claim 4, wherein after the acquiring a classification feature outputted by the classification feature extraction model, the method further comprises:

determining a confidence level of the target candidate image by using a target determination model and according to the classification feature;

performing, in a case that the determined confidence level is greater than or equal to a preset confidence level threshold, the operation of the obtaining the motion prediction data of the next image frame relative to the current image frame by using the classification feature as an input of the motion prediction model; and ending target tracking in a case that the determined confidence level is less than the preset confidence level threshold.

6. The method according to claim 4, wherein the obtaining the motion prediction data of the next image frame relative to the current image frame by using the classification feature as an input of the motion prediction model comprises:

determining probability values respectively corresponding to preset prediction classes by using the motion prediction model and according to the classification feature;

determining a preset prediction class corresponding to the largest probability value; and acquiring motion prediction data corresponding to the determined preset prediction class.

7. The method according to claim 1, further comprising:
acquiring model training data;
reading a current training frame and a next training frame from the model training data;
extracting an image feature from the current training frame;
determining motion training data of the next training frame relative to the current training frame; and
training the motion prediction model according to the extracted image feature and the determined motion training data.

8. The method according to claim 7, wherein after the extracting an image feature from the current training frame, the method further comprises:

performing a model training according to the image feature extracted from the current training frame, a target key point position marked in the current training frame, and a confidence level marked in the current training frame, to obtain a target positioning model and a target determination model.

9. The method according to claim 8, wherein the performing a model training according to the image feature extracted from the current training frame, a target key point position marked in the current training frame, and a confidence level marked in the current training frame, to obtain a target positioning model and a target determination model comprises:

performing the model training according to the current training frame and the image feature in the current training frame, to obtain an image feature extraction model;

performing the model training by using the image feature in the current training frame as an input and using the target key point position marked in the current training frame as an output, to obtain the target positioning model;

performing the model training by using the image feature in the current training frame as an input and using a classification feature marked in the current training frame as an output, to obtain a classification feature extraction model; and performing the model training according to the classification feature marked in the current training frame and the confidence level marked in the current training frame, to obtain the target determination model.

10. The method according to claim 7, wherein the determining motion training data of the next training frame relative to the current training frame comprises:

obtaining a target region marked in the next training frame;

determining target prediction regions of next training frames respectively corresponding to preset prediction classes according to the current training frame;

obtaining prediction accuracies respectively corresponding to the preset prediction classes according to the target region and the target prediction region; and determining preset motion training data corresponding to a preset prediction class corresponding to the highest prediction accuracy as the motion training data of the next training frame relative to the current training frame.

11. The method according to claim 10, wherein the obtaining prediction accuracies respectively corresponding to the preset prediction classes according to the target region and the target prediction region comprises:

determining an intersection region and a union region between the target prediction region and the target region in the next training frame corresponding to each preset prediction class; and calculating an area ratio of the intersection region corresponding to each preset prediction class to the corresponding union region, to obtain the prediction accuracy corresponding to the corresponding preset prediction class.

12. A computer device, comprising:
at least one memory storing computer program instructions; and at least one processor coupled to the at least one memory and, when executing the computer program instructions, configured to perform:
  determining a target candidate region of a current image frame;
  capturing a target candidate image matching the target candidate region from the current image frame;
  determining a target key point position by using a target positioning model and according to an image feature of the target candidate image;
  determining a target region of the current image frame according to the target key point position;
  determining motion prediction data of a next image frame relative to the current image frame by using a motion prediction model and according to the image feature of the target candidate image; and
  determining a target candidate region of the next image frame according to the target region and the motion prediction data.

13. The computer device according to claim 12, wherein the capturing a target candidate image matching the target candidate region from the current image frame comprises:
  enlarging the target candidate region in the current image frame by a preset multiple;
  determining a target candidate image matching the enlarged target candidate region in the current image frame; and
  capturing the determined target candidate image from the current image frame.

14. The computer device according to claim 12, wherein the determining a target key point position by using a target positioning model and according to the image feature of the target candidate image comprises:
  inputting the target candidate image into an image feature extraction model;
  acquiring an image feature outputted by the image feature extraction model; and
  obtaining a target key point position of the current image frame by using the image feature as an input of the target positioning model.

15. The computer device according to claim 14, wherein the determining motion prediction data of a next image frame relative to the current image frame by using a motion prediction model and according to the image feature of the target candidate image comprises:
  inputting the image feature into a classification feature extraction model;
  acquiring a classification feature outputted by the classification feature extraction model; and
  obtaining the motion prediction data of the next image frame relative to the current image frame by using the classification feature as an input of the motion prediction model.

16. The computer device according to claim 15, wherein the at least one processor is further configured to perform:
  determining a confidence level of the target candidate image by using a target determination model and according to the classification feature;
  performing, in a case that the determined confidence level is greater than or equal to a preset confidence level threshold, the operation of the obtaining the motion prediction data of the next image frame relative to the current image frame by using the classification feature as an input of the motion prediction model; and
  ending target tracking in a case that the determined confidence level is less than the preset confidence level threshold.

17. The computer device according to claim 15, wherein the obtaining the motion prediction data of the next image frame relative to the current image frame by using the classification feature as an input of the motion prediction model comprises:
  determining probability values respectively corresponding to preset prediction classes by using the motion prediction model and according to the classification feature;
  determining a preset prediction class corresponding to the largest probability value; and
  acquiring motion prediction data corresponding to the determined preset prediction class.

18. A non-transitory computer-readable storage medium storing computer program instructions executable by at least one processor to perform:
  determining a target candidate region of a current image frame;
  capturing a target candidate image matching the target candidate region from the current image frame;
  determining a target key point position by using a target positioning model and according to an image feature of the target candidate image;
  determining a target region of the current image frame according to the target key point position;
  determining motion prediction data of a next image frame relative to the current image frame by using a motion prediction model and according to the image feature of the target candidate image; and
  determining a target candidate region of the next image frame according to the target region and the motion prediction data.

* * * * *